United States Patent
Clark et al.

(10) Patent No.: US 9,697,466 B2
(45) Date of Patent: Jul. 4, 2017

(54) AUTOMATED OPINION PREDICTION BASED ON INDIRECT INFORMATION

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/576,486

(22) Filed: Dec. 19, 2014

(65) Prior Publication Data

US 2016/0180219 A1    Jun. 23, 2016

(51) Int. Cl.
*G06N 5/02* (2006.01)
*G06N 99/00* (2010.01)

(52) U.S. Cl.
CPC ........... *G06N 5/022* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,981,040 B1 * | 12/2005 | Konig | G06F 17/30867 707/E17.109 |
| 8,321,417 B2 | 11/2012 | Davids | |
| 9,020,956 B1 * | 4/2015 | Barr | G06F 17/30011 707/748 |
| 2001/0011073 A1 * | 8/2001 | Cheah | A01K 67/0275 514/16.9 |
| 2008/0103877 A1 | 5/2008 | Gerken | |
| 2010/0023311 A1 * | 1/2010 | Subrahmanian | G06F 17/275 704/2 |
| 2013/0132851 A1 * | 5/2013 | Konopniki | G06F 17/30867 715/736 |
| 2013/0151612 A1 | 6/2013 | Dunn et al. | |

(Continued)

FOREIGN PATENT DOCUMENTS

CN    103365997 A    10/2013

OTHER PUBLICATIONS

U.S. Appl. No. 14/883,411, entitled Automated Opinion Prediction Based on Indirect Information, filed Oct. 14, 2015.

(Continued)

*Primary Examiner* — Alan Chen
(74) *Attorney, Agent, or Firm* — Patterson + Sheridan, LLP

(57) ABSTRACT

Techniques are disclosed to determine an expected or predicted opinion of a target individual. To do so, a deep question answer system may build a corpus which includes a first collection of documents attributable to a first person and a second collection of documents identified from content in the first collection of documents and evaluate the corpus to build a model representing opinions of the first person relative to topics, concepts, or subjects discussed in the first and second collections of documents. The deep question answer system may also receive a request to predict an opinion of the first person regarding a topic and generate a predicted opinion of the first person regarding the topic from the model.

20 Claims, 5 Drawing Sheets

(56) References Cited

U.S. PATENT DOCUMENTS

| | | | |
|---|---|---|---|
| 2013/0339445 A1 | 12/2013 | Perincherry | |
| 2014/0019443 A1* | 1/2014 | Golshan | G06F 17/30867 707/723 |
| 2014/0172857 A1 | 6/2014 | Powell | |
| 2015/0347905 A1* | 12/2015 | Chen | G06N 99/005 706/12 |

OTHER PUBLICATIONS

Yu et al., "A Survey of Prediction Using Social Media," arXiv preprint arXiv: 1203.1647, 2012.

Pang et al., "Opinion mining and sentiment analysis," Foundations and Trends in Information Retrieval, vol. 2, No. 1-2, 1-135, 2008.

\* cited by examiner

AUTOMATED OPINION PREDICTION BASED ON INDIRECT INFORMATION

BACKGROUND

Embodiments disclosed herein relate to the field of computer software. More specifically, embodiments disclosed herein relate to computer software which predicts opinions of a person based in part on the information sources consumed.

Deep question answering systems answer questions by finding and evaluating candidate answers and supporting evidence from a corpus of ingested information. However, deep question answering systems traditionally assume that answers and supporting evidence will exist in a known corpus. While this approach works well with fact-based information, processing but forecasting opinions cannot be approached the same way as a person my not yet have expressed an opinion on the topic in an accessible way.

SUMMARY

Embodiments disclosed herein include a system and computer program product for predicting an opinion. As described, embodiments described herein may build a corpus which includes a first collection of documents attributable to a first person and a second collection of documents identified from content in the first collection of documents and evaluate the corpus to build a model representing opinions of the first person relative to topics, concepts, or subjects discussed in the first and second collections of documents. Embodiments disclosed herein may further receive a request to predict an opinion of the first person regarding a topic and generate a predicted opinion of the first person regarding the topic from the model.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
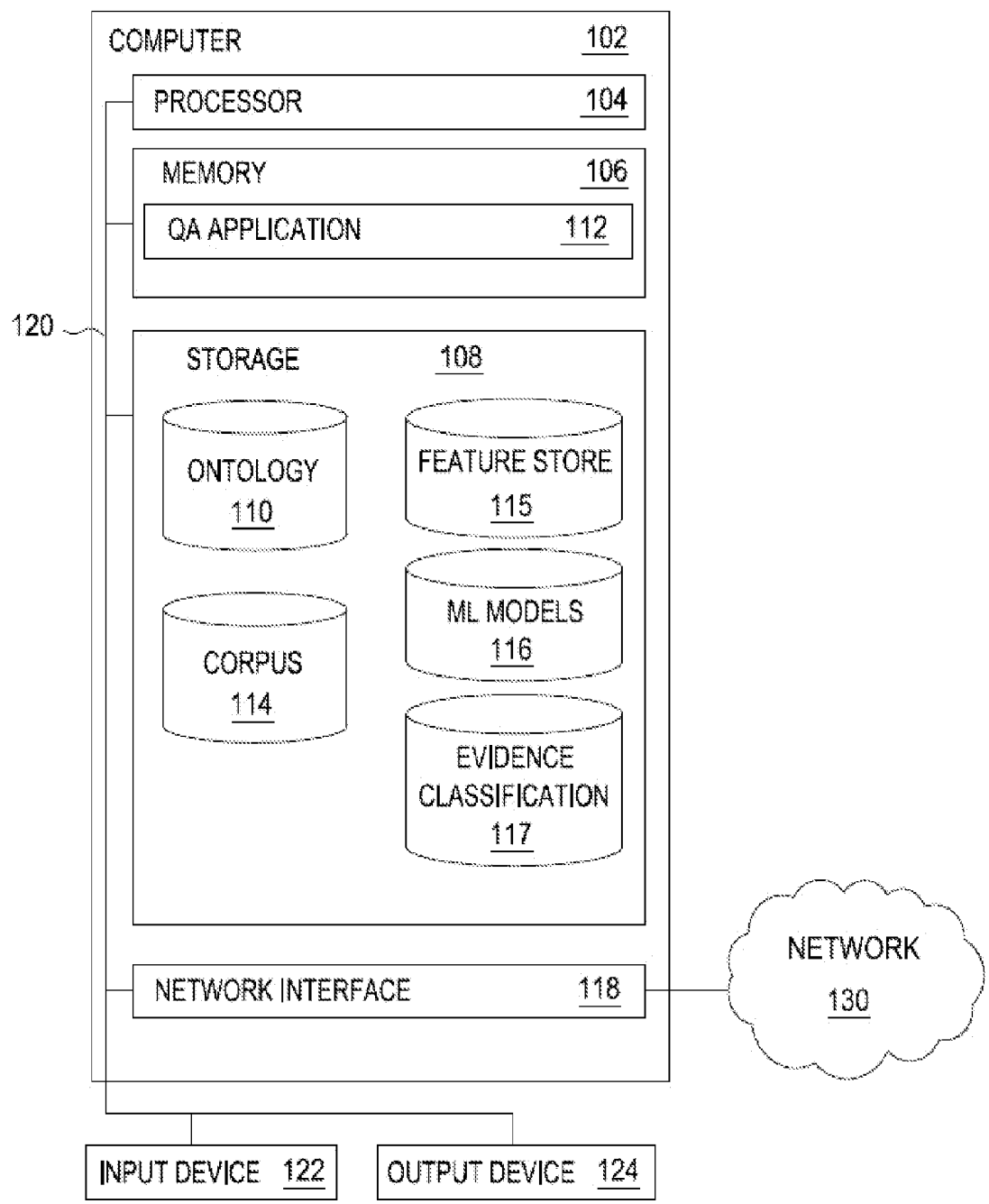
FIG. 1 is a block diagram illustrating a system for automated opinion prediction based on indirect information, according to one embodiment.

Embodiments disclosed herein use an automated opinion prediction system to predict the opinion of a person, using information authored by that person and information secondary information sources consumed (or influential) to that person. To more accurately predict an opinion of a person, the system evaluates direct information authored or created by the person along with sources of information the person consumes, and the person's opinion regarding the sources (or regarding a particular document, article, post, etc). By processing both direct information, indirect information, and opinions reflected in direct and indirect information, the system may more accurately predict the opinion of the person regarding a topic or question of interest.

Generally, embodiments disclosed herein provide techniques for predicting an opinion of a person, especially where the person's opinion holds a particular power or value. This need is highlighted in political, marketing, and other contexts where the opinion of an individual (such as a judge or executive) may be a strong indicator of how that individual will decide a given issue or question. In such contexts, analyzing the prior information generated by the person allows a model of the individual to be developed. However, the predictive value of such a model decreases for areas where there is less prior information. Ingesting the information produced by the sources the person consumes significantly expands the scope available information used to model the opinions of the individual. The information sources may also be tested to determine which sources and in what context those sources correlate with the information generated by the person.

An automated opinion prediction system may process cases through a single analysis "pipeline." A pipeline may represent the execution of various analysis programs, or engines, on both the direct information produced by a person and indirect information in order to deduce a predicted opinion. A typical pipeline may begin with direct information analysis, which searches and analyzes the direct information produced by the person, for example, using natural language processing (NLP), to extract and label topics discussed by the person. Once the topics are identified, the pipeline may determine what, if any, sentiment the person has previously expressed on a topic identified in the content, i.e., whether the target person has a favorable or unfavorable view of the topic. Such a measure of sentiment could also be quantified using a range of values or stated qualitatively in terms of "likes" or "dislikes," etc. The pipeline may include indirect information analysis, such as searching and analyzing the sources and documents the person likely consumes to determine what, if any, opinions are expressed in the indirect information on the topic. The opinions expressed in the indirect information source may be cross referenced against the sentiment the person expresses about the indirect information source to determine how predictive the indirect information source may be. The opinion prediction system may then generate a predicted opinion for the person on the topic. As noted, the predicted opinion may be generated as a measure of sentiment toward the topic (e.g., favorability). However, the system may also predict a person's opinion in terms of what decision the target person would make in response to a given question (or class of questions) or how a given issue should be resolved. That is, while an opinion may be expressed as a sentiment, an opinion may be broader than a sentiment. The system may also provide supporting evidence for the predicted opinion.

Unique pipelines may be created for each domain or problem space (e.g. a different pipeline is used for supporting cancer treatments, diagnoses, predicting opinions, etc.). In fact, analysis engines themselves may be unique to a particular domain (e.g., identification of a tumor stage or size, identification of health issues, predicting opinions, etc.). Question and answer analysis within a pipeline may also include complex natural language processing algorithms, used, for example, to identify deep semantic relationships within the text. The scoring phase of a deep QA system, such as IBM's Watson, may call various scoring algorithms to help identify a correct answer (or response) to a case. A scoring algorithm may generate one or more feature scores to indicate a measure of confidence for each answer. The deep QA system may also use a training phase to learn which features, or combinations of features, are best at predicting a correct answer for different questions. Once the deep QA system has been properly trained, subsequent questions flowing through the pipeline may use the machine-learned model for finding the most likely correct answer.

FIG. 1 is a block diagram illustrating a system 100 for question classification and feature mapping in deep question answering systems, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, removable memory cards or optical storage. The memory 106 and the storage 108 may be part of one virtual address space spanning multiple primary and secondary storage devices.

As shown, the memory 106 contains the QA application 112, which is an application generally configured to operate a deep question answering (QA) system. One example of a deep question answering system is Watson, by the IBM Corporation of Armonk, N.Y. A user may submit a case (also referred to as a question) to the QA application 112, which provides an answer to the case. In one embodiment, for example, the QA system may predict an opinion of a given individual (or group of individuals) on a topic, concept, or issue, identified in a question, based on an analysis of a corpus of information. The QA application 112 may execute a pipeline to generate a predicted opinion to the case, which is returned to the user.

As shown, storage 108 contains an ontology 110, corpus 114, feature store 115, ML models 116, and evidence classification 117. The ontology 110 provides a structural framework for organizing information. An ontology formally represents knowledge as a set of concepts within a domain, and the relationships between those concepts. The corpus 114 is a body of information used by the QA application 112 to generate answers to cases. Information, both direct and indirect, are identified and incorporated into the corpus 114 in order to build a model of the opinion of a given individual on a topic, concept, or issue. Information can be obtained from any available source for inclusion in the corpus 114. For example, the corpus 114 may contain direct information, such as scholarly articles, court opinions, dictionary definitions, encyclopedia references, websites, social media postings and the like, as well as indirect information, such as linked or "liked" articles, people "followed," referenced websites, or shows the given individual has expressed an interest in. Machine learning (ML) models 116 are models created by the QA application 112 during the training phase, which are used during a runtime pipeline to score and rank candidate answers to cases based on features previously generated for each answer. Evidence classification 117 stores relationships between evidence from the corpus 114, the question context, and the predictive features. Although depicted as a database, ontology 110, corpus 114, feature store 115, ML models 116, and evidence classification 117 may take any form sufficient to store data, including text files, xml data files, and the like. In one embodiment, the ontology 110 is part of the corpus 114. Although depicted as residing on the same computer, any combination of the QA application 112, the ontology 110, corpus 114, feature store 115, ML models 116, and evidence classification 117 may reside on the same or different computers.

The input device 122 provides input to the computer 102. For example, a keyboard and/or a mouse may be used. The output device 124 may be any device for providing output to a user of the computer 102. For example, the output device 124 may be any conventional display screen. Although shown separately from the input device 122, the output device 124 and input device 122 may be combined. For example, a display screen with an integrated touch-screen may be used.

Figure 2:
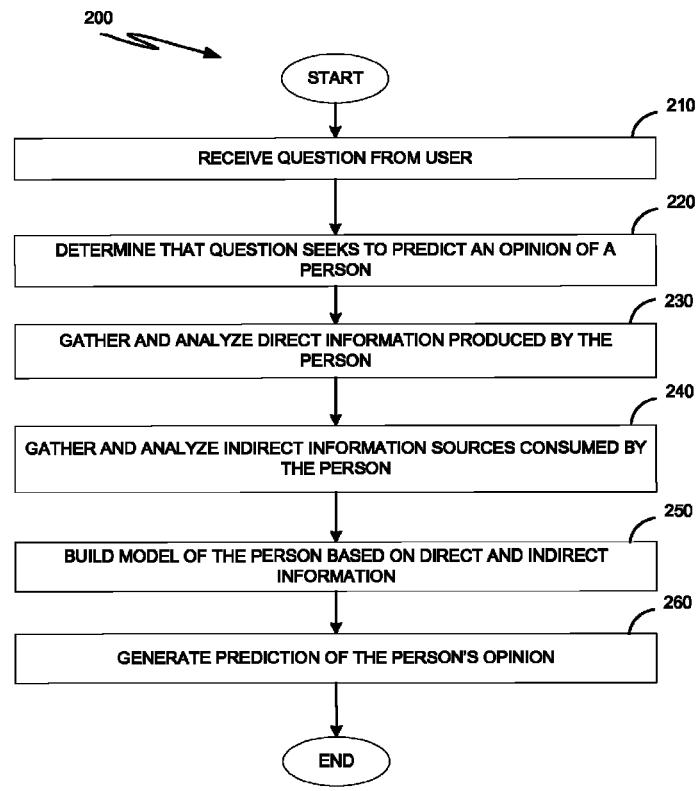
FIG. 2 is a flow chart illustrating a method for automated opinion prediction based on indirect information, according to one embodiment.

FIG. 2 is a flow chart illustrating a method 200 for predicting an opinion of an individual by evaluating direct and indirect information, according to one embodiment. At step 210, the QA application receives a question from a user seeking to predict an opinion of a target person or group on a particular topic. At step 220, the QA application 112 determines that the question seeks to predict an opinion of a person for a given topic. This may be done by processing the question to identify topics present in the question and identify what answer is being sought, e.g. whether a person would have a favorable or unfavorable view of a topic or will agree with a particular statement. A person is also identified from the question. Any suitable method may be used to identify the question context, including the use of natural language processing (NLP) to extract normalized terms and concepts from the question. At step 230, the QA application 112 gathers direct information by authored (or is otherwise directly attributable to) the person. Information may be gathered from any available resource, including printed publications, TV and radio shows, and content from the internet. Generally, direct information refers to any content authored or created by a person and may include articles, reviews, court cases, social media, etc. For example, where the person is a judge, direct information may include opinions written by the judge and any law review, newspaper, and/or other published articles. Additionally, if the judge uses social media, such as in blogs, micro blogs, social media, social networking sites, messaging systems, platforms allowing an expression of opinion etc., this information would also be added to the corpus 114. Step 230 is discussed in greater detail with reference to FIG. 3.

At step 240, the QA application 112 gathers indirect information sources consumed by the person. In the above example, published articles, reviews, blogs, etc., may be identified and particular website, judges/justices, authors, shows, etc. may be identified as a source of information consumed by the judge. Further, articles or posts "liked" or linked to by the judge may be identified and sources for these articles determined. For example, if the judge links to posts from a particular website, that website may be identified as a source of information consumed by the judge. The parsed direct sources may be analyzed in context to identify sources explicitly cited (e.g., a link to a blog post, news article about a topic, etc). Indirect sources may also be identified from content that references (or is associated with) a secondary content source without a specific link or reference to a particular document. For example, the while a judge might not cite a particular TV or radio channel, if the judge were to post that they heard about a story on a given TV channel, that TV channel may also be identified as a source of information consumed by the judge. Where author, series, section, or other more granular information is available, the identification of the sources may include the more granular information. Once the sources are identified, resources from the source are gathered and added to the corpus 114. The step 240 is discussed in greater detail with reference to FIG. 4. At step 250, the QA application 112 builds a model of the person based on both direct and indirect information contained in the corpus 114, factoring in sentiment and correlation weights of the person toward sources of indirect information. QA application 112 may leverage predictive algorithms (or models) in order to generate predictive opinions for a person. The predictive algorithms may be generated by the QA application 112, or by a different source. Models may be trained based on opinions and sentiments expressed by the person in direct information on, for example, concepts other than the question topic and may encompass a range of concepts. At step 260, a prediction of a person's opinion generated by applying the topic identified in the question to the model. This prediction may then be returned to the user, along with information related to the level of confidence in the prediction from the model as well as supporting evidence for the prediction.

Figure 3:
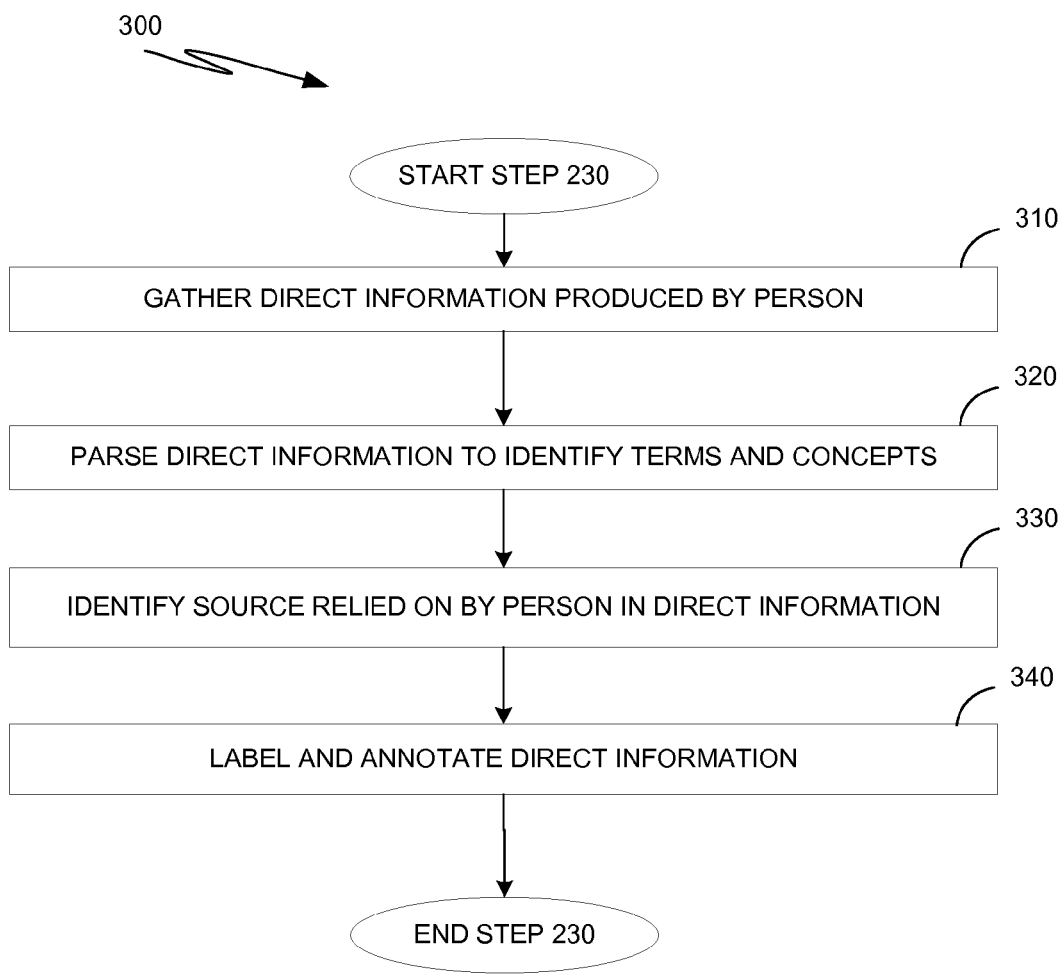
FIG. 3 is a flow chart illustrating a method for analyzing direct information produced by a person, according to one embodiment.

FIG. 3 illustrates a method 300 for analyzing direct information produced by a person, according to one embodiment At step 310, direct information produced by a person is gathered. Information may be gathered from any available resource, including, but not limited to printed publications, TV and radio shows, and content from the internet, such as blogs or social media. At step 320, each piece of direct information is parsed using any technique, including NLP, to identify terms and concepts expressed in the piece of information as well as any sources relied upon by the person. In some cases, the available direct information may not directly address or is otherwise limited with regards to the topic. As an example, when trying to predict the opinion of the judge for related to one legal issue, if the judge does not have an extensive history of hearing cases about that issue, the predictive value of the direct information may be limited. Evaluating indirect information from the sources of information which are believed to be influential (whether positive or negative) on the judge may greatly expand the content available for analysis and modeling. At step 330, the source relied upon by the user for the piece of direct information is identified. For example, where the judge has linked or "liked" articles, people "followed," referenced websites, or shows the judge has expressed an interest in may be identified as sources of indirect information. Where the source associated with the person is identified, the context in which the source is referenced may be analyzed in order to determine the sentiment of the person to the source. For example, where the person "likes" an article or posts a favorable review of a book, the person expresses a positive sentiment toward the source making it more probable that the person agrees with the opinions expressed in the article or book. Conversely, where a person cites an article in contrast or indicates that they disliked a book, the person expresses a negative sentiment toward the source and making it less probable that the person agrees with the opinions expressed in the source. This sentiment of the person to the source may be used, in part, to calculate a correlation weight for the source. In addition, the way in which the source is used may also to calculate the correlation weight. For example, where a person directly cites a particular piece of indirect information, such as a webpage or a section of a book, may be accorded a different correlation weight than where the person cites an entire website or book. The determined sentiment and correlation weight associated with an independent source may then be stored. At step 340, the parsed direct information is labeled and annotated with the identified terms and concepts and are added into the corpus 114.

Figure 4:
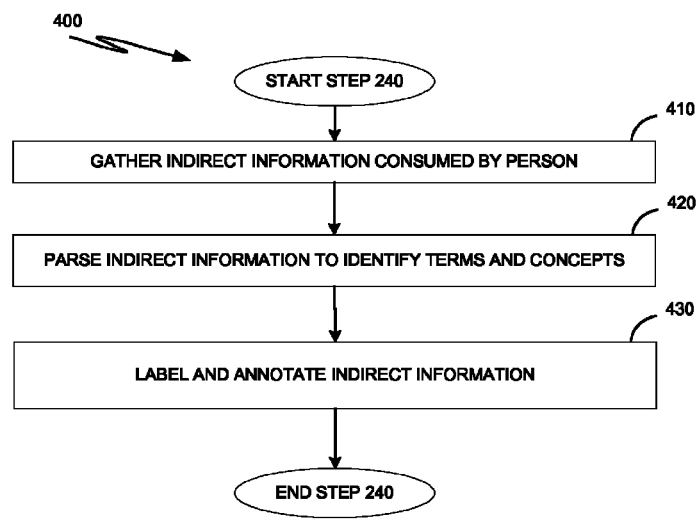
FIG. 4 is a flow chart illustrating a method for analyzing indirect information sources consumed by the person, according to one embodiment.

FIG. 4 illustrates a method 400 for analyzing indirect information sources consumed by the person, according to one embodiment disclosed herein. At step 410, indirect information consumed by a person is gathered. As with direct information, indirect information may be gathered from any available resource, including, but not limited to printed publications, TV and radio shows, and content from the internet, such as blogs or social media. For sources such as a website or newspaper with many pieces of information or articles, as many pieces of information or articles are gathered as are accessible or feasible. At step 420, the gathered indirect information is parsed using any technique, including NLP, to identify terms and concepts addressed in the piece of indirect information. Sources identified in step 330 may be parsed. This parsing may occur as the indirect information is gathered, or after gathering is complete. At step 430, the parsed indirect information is labeled and annotated with the identified terms and concepts and are added into the corpus 114. Sentiment and correlation weight for the indirect sources determined in step 330 is associated with the pieces of indirect information and may be stored in the corpus 114.

Optionally, indirect information may also be parsed to determine tertiary sources relied upon by the indirect information. Tertiary sources may be added into the corpus 114 as well. However, as the information source becomes more attenuated from the person, the source may be accorded a lower correlation weight. Sources with a correlation weight below or within a certain threshold may be filtered or not used.

The QA application 112 may, also test indirect information sources to determine how well opinions expressed in the indirect information source correlate with those expressed by the person. For example, a concept that appears in the direct evidence may be selected and the indirect sources tested against the opinions expressed by the person in the direct sources. This testing may or may not be performed on the question topic and may encompass a range of concepts to determine which sources express opinions positively correlated to the opinions expressed by the person to determine trusted sources. Testing also may determine which sources express opinions which are negatively correlated with the opinions expressed by the person. These correlations may then be used to further determine correlation weights for the sources for use in predicting the opinion of the person. These correlations may be established during a training phase.

Figure 5:
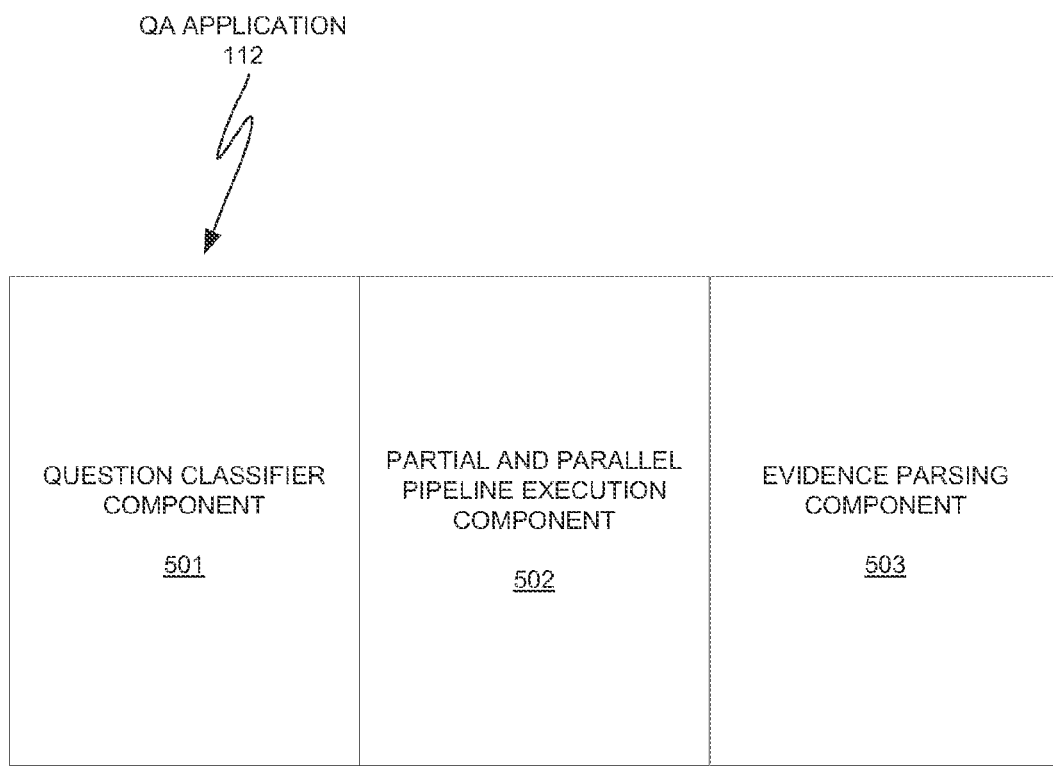
FIG. 5 is a block diagram illustrating components of an automated opinion prediction system, according to one embodiment.

FIG. 5 is a block diagram illustrating components of a deep question answering system, according to one embodiment disclosed herein. In one embodiment, the deep question answering system is the QA application 112. As shown, the QA application 112 contains a question classifier component 501, a partial and parallel pipeline execution component 502, and an evidence parsing component 503. The question classifier component 501 may parse questions to determine that the question seeks to predict an opinion and identify the topic on which the opinion is sought. Once identified, the topic may be stored in a feature store, such as feature store 115. The partial and parallel pipeline execution component 502 may, when presented with a case, access the topic defined in the feature store 115 to reduce processing of sources that do not discuss the topic identified. The intelligent evidence parsing component 503 may identify relevant pieces of information from the direct and indirect information, parse the information, and store these pieces of information in the corpus 114. The evidence may be existent or non-existent. The intelligent evidence parsing component 503 may further reprocess sources or topics in the corpus as new sources or topics are identified.

In the preceding, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will be understood that each block of the flowchart illustrations and/or block diagrams, and combinations of blocks in the flowchart illustrations and/or block diagrams, can also be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a deep question answering system or related data available in the cloud. For example, the deep question answering system could execute on a computing system in the cloud and provide question classification and feature mapping. In such a case, the deep question answering system could classify questions, map features and store the resultant data sets at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A system for predicting an opinion, the system comprising:
    one or more computer processors;
    a memory containing a program which, when executed by the one or more computer processors, performs an operation comprising:
        building a corpus which includes a first collection of documents attributable to a first person and a second collection of documents not attributable to the first person, wherein the second collection of documents is identified from content in the first collection of documents, wherein each of the second collection of documents is available from a respective secondary source;
        evaluating the corpus to build a model representing opinions of the first person relative to topics, concepts, or subjects discussed in the first and second collections of documents, including determining, for each secondary source, a source weight factor characterizing a presumed opinion of the secondary source held by the first person;
        receiving a request to predict an opinion of the first person regarding a topic specified in the request;
        generating a predicted opinion of the first person regarding the topic from the model, based on: (i) the opinions of the first person relative to topics, concepts, or subjects discussed in the first and second collections of documents and (ii) each source weight factor characterizing the presumed opinion of the respective secondary source held by the first person; and
        returning the predicted opinion responsive to the request.

2. The system of claim 1, wherein building the corpus comprises:
    parsing the first collection of documents to identify secondary sources, wherein each document in the second collection of documents is available from a respective one of the secondary sources; and
    accessing each secondary source to identify documents to add to the second collection of documents.

3. The system of claim 2, wherein evaluating the corpus comprises:
    identifying topics, concepts, or subjects referenced by documents in the first collection of documents; and
    determining indications of opinions expressed about the topics, concepts, or subjects referenced by documents in the first collection.

4. The system of claim 3, wherein determining the source weight factor comprises correlating the topics, concepts, or subjects identified in one of the secondary sources with the associated topics, concepts, or subjects identified in the first collection of documents.

5. The system of claim 4, wherein the predicted opinion of the first person regarding the topic from the model is generated based on: (i) indications of opinions expressed about the topics, concepts, or subjects referenced by documents in the first collection; (ii) indications of opinions on one or more of the topics, concepts, or subjects referenced by documents in the second collection; and (iii) each source weight factor characterizing the presumed opinion of the respective secondary source held by the first person.

6. The system of claim 1, wherein the program comprises a plurality of components including a question classifier component, a partial and parallel pipeline execution component, and an evidence parsing component.

7. The system of claim 6, wherein the question classifier component is configured to parse a question in order to determine that the question seeks to predict the opinion and further configured to identify the topic on which the opinion is sought, wherein the topic is stored in a feature store.

8. The system of claim 1, wherein the partial and parallel pipeline execution component is configured to access the identified topic in order to reduce processing of sources that do not discuss the identified topic.

9. The system of claim 8, wherein the evidence parsing component is configured to identify relevant pieces of information from both direct and indirect information, parse the identified information, store the identified information in the corpus, and reprocess sources and topics in the corpus as new sources and topics are identified.

10. The system of claim 9, wherein building the corpus comprises:
 parsing the first collection of documents to identify secondary sources, wherein each document in the second collection of documents is available from a respective one of the secondary sources; and
 accessing each secondary source to identify documents to add to the second collection of documents.

11. The system of claim 10, wherein evaluating the corpus comprises:
 identifying topics, concepts, or subjects referenced by documents in the first collection of documents; and
 determining indications of opinions expressed about the topics, concepts, or subjects referenced by documents in the first collection.

12. The system of claim 11, wherein the first person represents a group of individuals, wherein the predicted opinion is returned along with the documents which reference the topic, wherein the predicted opinion is output, wherein evaluating the corpus further includes:
 parsing each document accessed from each secondary source to identify topics, concepts, or subjects referenced by the respective document from the respective secondary source; and
 determining indications of opinions on the topics, concepts, or subjects referenced by documents in the second collection.

13. The system of claim 1, wherein evaluating the corpus comprises determining indications of opinions expressed about the topics, concepts, or subjects referenced by documents in the first collection.

14. The system of claim 1, further comprising returning the documents which reference the topic.

15. A computer program product to predict an opinion, the computer program product comprising:
 a computer-readable storage medium having computer-readable program code embodied therewith, the computer-readable program code executable by one or more computer processors to perform an operation comprising:
  building a corpus which includes a first collection of documents attributable to a first person and a second collection of documents not attributable to the first person, wherein the second collection of documents is identified from content in the first collection of documents, wherein each of the second collection of documents is available from a respective secondary source;
  evaluating the corpus to build a model representing opinions of the first person relative to topics, concepts, or subjects discussed in the first and second collections of documents, including determining, for each secondary source, a source weight factor characterizing a presumed opinion of the secondary source held by the first person;
  receiving a request to predict an opinion of the first person regarding a topic specified in the request;
  generating a predicted opinion of the first person regarding the topic from the model, based on: (i) the opinions of the first person relative to topics, concepts, or subjects discussed in the first and second collections of documents and (ii) each source weight factor characterizing the presumed opinion of the respective secondary source held by the first person; and
  returning the predicted opinion responsive to the request.

16. The computer program product of claim 15, wherein building the corpus comprises:
 parsing the first collection of documents to identify secondary sources, wherein each document in the second collection of documents is available from a respective one of the secondary sources; and
 accessing each secondary source to identify documents to add to the second collection of documents.

17. The computer program product of claim 16, wherein evaluating the corpus comprises:
 identifying topics, concepts, or subjects referenced by documents in the first collection of documents; and
 determining indications of opinions expressed about the topics, concepts, or subjects referenced by documents in the first collection.

18. The computer program product of claim 17, wherein determining the source weight factor comprises correlating the topics, concepts, or subjects identified in one of the secondary sources with the associated topics, concepts, or subjects identified in the first collection of documents.

19. The computer program product of claim 18, wherein the predicted opinion of the first person regarding the topic from the model is generated based on: (i) indications of opinions expressed about the topics, concepts, or subjects referenced by documents in the first collection; (ii) indications of opinions on one or more of the topics, concepts, or subjects referenced by documents in the second collection; and (iii) each source weight factor characterizing the presumed opinion of the respective secondary source held by the first person.

20. The computer program product of claim 15, wherein evaluating the corpus comprises determining indications of opinions expressed about the topics, concepts, or subjects referenced by documents in the first collection.

* * * * *